United States Patent
Zhao et al.

(10) Patent No.: US 12,394,832 B2
(45) Date of Patent: Aug. 19, 2025

(54) THERMAL MANAGEMENT METHOD AND THERMAL MANAGEMENT SYSTEM

(71) Applicant: CONTEMPORARY AMPEREX TECHNOLOGY (HONG KONG) LIMITED, Hong Kong (CN)

(72) Inventors: Yuanmiao Zhao, Ningde (CN); Xiaojian Huang, Ningde (CN); Zhanliang Li, Ningde (CN); Zhimin Dan, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 136 days.

(21) Appl. No.: 18/446,550

(22) Filed: Aug. 9, 2023

(65) Prior Publication Data

US 2023/0387494 A1 Nov. 30, 2023

Related U.S. Application Data

(63) Continuation of application No. PCT/CN2021/126254, filed on Oct. 26, 2021.

(51) Int. Cl.
| | |
|---|---|
| *H01M 10/633* | (2014.01) |
| *H01M 10/613* | (2014.01) |
| *H01M 10/615* | (2014.01) |
| *H01M 10/6552* | (2014.01) |
| *H01M 10/6568* | (2014.01) |
| *H01M 10/657* | (2014.01) |

(52) U.S. Cl.
CPC ....... *H01M 10/633* (2015.04); *H01M 10/613* (2015.04); *H01M 10/615* (2015.04); *H01M 10/6552* (2015.04); *H01M 10/6568* (2015.04); *H01M 10/657* (2015.04)

(58) Field of Classification Search
CPC ............. H01M 10/633; H01M 10/613; H01M 10/615; H01M 10/6552; H01M 10/6568; H01M 10/657; H01M 10/663; H01M 10/625; H01M 2220/20; H01M 10/66; B60L 2240/36; B60L 2240/545; B60L 58/27; B60L 58/24; Y02E 60/10; B60Y 2200/91; B60Y 2400/112; Y02T 10/70
See application file for complete search history.

(56) References Cited

U.S. PATENT DOCUMENTS

| | | | | |
|---|---|---|---|---|
| 2012/0094152 | A1* | 4/2012 | Wu | ........ H01M 10/486 429/50 |
| 2013/0111932 | A1* | 5/2013 | Mishima | ........ B60L 58/27 62/159 |
| 2014/0360207 | A1 | 12/2014 | Choi et al. | |
| 2017/0222285 | A1 | 8/2017 | Li | |
| 2019/0363550 | A1* | 11/2019 | Zuo | ........ H01M 10/425 |
| 2020/0274209 | A1 | 8/2020 | Takazawa et al. | |
| 2021/0309075 | A1 | 10/2021 | Hasegawa et al. | |

FOREIGN PATENT DOCUMENTS

| | | |
|---|---|---|
| CN | 104577254 A | 4/2015 |
| CN | 205194809 U | 4/2016 |
| CN | 107351695 A | 11/2017 |
| CN | 110383574 A | 10/2019 |
| CN | 210000061 U | 1/2020 |
| CN | 111628238 A | 9/2020 |
| CN | 111628238 B | 9/2020 |
| CN | 113752905 A | 12/2021 |
| DE | 60030630 T2 | 9/2007 |
| EP | 2590254 A2 | 5/2013 |
| JP | 2012178899 A | 9/2012 |
| JP | 2013095409 A1 | 5/2013 |
| JP | 2018153074 A | 9/2018 |
| JP | 2020109754 A | 7/2020 |

OTHER PUBLICATIONS

Extended European Search Report for EP application No. 21961677.8, dated Dec. 17, 2024.
First Office Action of CN application No. 202180038532.2, dated Apr. 13, 2024.
International Search Report for International Application PCT/CN2021/126254, mailed Jul. 6, 2022.
Notice of Reasons for Refusal, JP application No. 2023-541944, dated Jul. 29, 2024.
Notification to Grant Patent Right for Invention, CN application No. 202180038532.2, dated Aug. 5, 2024.
Office action from corresponding South Korean Patent Application No. 10-2023-7022994 dated Mar. 4, 2025, and its English translation.

* cited by examiner

*Primary Examiner* — Muhammad S Siddiquee
(74) *Attorney, Agent, or Firm* — Ladas & Parry, LLP

(57) ABSTRACT

Embodiments of this application provide a thermal management method and a thermal management system. The thermal management method is applied to a thermal management system including a heating apparatus, a battery pack, and a pipeline subsystem. The pipeline subsystem is in thermal contact with the heating apparatus and the battery pack. The thermal management method includes: measuring temperature of the heating apparatus and battery pack temperature of the battery pack under the condition that the heating apparatus is in operating state; and transferring heat from the heating apparatus to the battery pack via the pipeline subsystem under the condition that the temperature of the heating apparatus is higher than the battery pack temperature. According to the embodiments of this application, the thermal management efficiency can be improved and the thermal management costs can be reduced.

17 Claims, 8 Drawing Sheets

THERMAL MANAGEMENT METHOD AND THERMAL MANAGEMENT SYSTEM

CROSS REFERENCE TO RELATED APPLICATION

This application is a continuation of International Patent Application No. PCT/CN2021/126254, filed on Oct. 26, 2021, which is incorporated by reference in its entirety.

TECHNICAL FIELD

This application relates to the field of thermal management technologies, and specifically, to a thermal management method and a thermal management system.

BACKGROUND

In general, battery packs are increasingly used as power sources for various electric apparatuses (for example, electric vehicles). However, the performance of the battery packs is affected by the environment in which they are used. For example, the performance of the battery packs may be degraded to some extent in low-temperature environments. Therefore, various technologies can be used to manage the heat of the battery pack.

The existing thermal management has the problems of low efficiency and high costs. For the technology of external heating, heat transfer between among a heat source, a medium, and a heating target is required, resulting in great loss and low efficiency; while for the technology of internal heating, the current needs to flow through the conductor and impedance element, resulting in great loss and heat waste. Using the power of the battery pack to heat itself affects energy consumption and the range of the electric vehicle. In addition, the increase in cost associated with attempting to improve heating efficiency does not match the increase in heating efficiency, resulting in a phenomenon of allowing part of heat to be dissipated.

SUMMARY

In view of the preceding problems, this application provides a thermal management method and a thermal management system so as to overcome or alleviate the problems of low thermal management efficiency and high costs.

According to a first aspect, this application provides a thermal management method applied to a thermal management system including a heating apparatus, a battery pack, and a pipeline subsystem, where the pipeline subsystem is in thermal contact with the heating apparatus and the battery pack; and the thermal management method includes: measuring temperature of the heating apparatus and battery pack temperature of the battery pack under the condition that the heating apparatus is in operating state; and transferring heat from the heating apparatus to the battery pack via the pipeline subsystem under the condition that the temperature of the heating apparatus is higher than the battery pack temperature.

In the technical solution of this embodiment of this application, the thermal management method is implemented using the thermal management system including the heating apparatus, the battery pack, and the pipeline subsystem. In the system, the thermal contact is formed between the pipeline subsystem and the heating apparatus and between the pipeline subsystem and the battery pack. The thermal contact between the pipeline subsystem and the heating apparatus and the thermal contact between the pipeline subsystem and the battery pack can implement heat transfer from the heating apparatus to the battery pack via the pipeline subsystem under the condition that the heating apparatus is in operating state and the temperature of the heating apparatus is higher than the battery pack temperature.

In some embodiments, the pipeline subsystem includes a heat exchange medium capable of flowing therein, and the pipeline subsystem further includes a battery pack heat exchanger in thermal contact with the battery pack and a heating apparatus heat exchanger in thermal contact with the heating apparatus, such that the heat exchange medium is capable of transferring heat with the heating apparatus and the battery pack. The heat exchange medium, battery pack heat exchanger, and heating apparatus heat exchanger included in the pipeline subsystem can increase the efficiency of heat transfer from the heating apparatus to the battery pack.

In some embodiments, the temperature of the heating apparatus is measured at a medium outflow port of the heating apparatus heat exchanger. By measuring the temperature of the medium at the medium outflow port of the heating apparatus heat exchanger, a time point for heat transfer can be easily determined, to be specific, when the measured temperature of the heating apparatus is higher than the battery pack temperature, heat transfer from the heating apparatus to the battery pack can be implemented.

In some embodiments, the thermal management method further includes: measuring the temperature of the heating apparatus, and under the condition that the measured temperature of the heating apparatus is higher than a first heating apparatus temperature threshold, causing the heat exchange medium in the pipeline subsystem to circulate in a manner of avoiding the battery pack heat exchanger. This step may be performed before measuring the temperature of the heating apparatus and the battery pack temperature. Measuring the temperature of the heating apparatus may be accomplished by measuring temperature of one or more components of the heating apparatus. When the temperature of the heating apparatus is higher than the first heating apparatus temperature threshold, the temperature of the heating apparatus may be considered high enough such that heat from the heating apparatus can be transferred to the heat exchange medium in the pipeline subsystem. In this case, causing the heat exchange medium to avoid the battery pack heat exchanger can avoid the heat transfer from the heat exchange medium to the battery pack, such that the heat from the heating apparatus can be fully transferred to the heat exchange medium, rapidly increasing the temperature of the heat exchange medium and improving the thermal management efficiency.

In some embodiments, the thermal management method further includes: measuring the temperature of the heating apparatus, and under the condition that the measured temperature of the heating apparatus is higher than a second heating apparatus temperature threshold, causing the heat exchange medium in the pipeline subsystem to circulate in a manner of avoiding the battery pack heat exchanger, and turning on a cooling module connected to the pipeline subsystem to cool the heat exchange medium. This step may be performed after transferring heat from the heating apparatus to the battery pack. Measuring the temperature of the heating apparatus may be accomplished by measuring temperature of one or more components of the heating apparatus. When the temperature of the heating apparatus is higher than the second heating apparatus temperature threshold, where the second heating apparatus temperature threshold is higher than the first heating apparatus temperature threshold, the temperature of the heating apparatus may be considered too high such that the heating apparatus can be cooled. In this case, causing the heat exchange medium to avoid the battery pack heat exchanger and turning on the cooling module can avoid the heat transfer from the battery pack to the heat exchange medium while cooling the heat exchange medium, such that the heat exchange medium can be fully cooled so as to rapidly reduce the temperature of the heating apparatus, improving the thermal management efficiency.

According to a second aspect, this application provides a thermal management system including a battery pack, a heating apparatus, and a pipeline subsystem, where the pipeline subsystem is in thermal contact with the heating apparatus and the battery pack; the thermal management system is configured to measure temperature of the heating apparatus and battery pack temperature of the battery pack under the condition that the heating apparatus is in operating state; and the pipeline subsystem is configured to transfer heat from the heating apparatus to the battery pack under the condition that the temperature of the heating apparatus is higher than the battery pack temperature.

In the technical solution of this embodiment of this application, the thermal management system is formed by the battery pack, the heating apparatus, and the pipeline subsystem. In the system, an electrical connection is formed between the heating apparatus and the battery pack, and thermal contact is formed between the pipeline subsystem and the battery pack and between the pipeline subsystem and the heating apparatus. Through the electrical connection between the heating apparatus and the battery pack, the heating apparatus can apply current to the battery pack to heat the battery pack. The thermal contact between the pipeline subsystem and the heating apparatus and the thermal contact between the pipeline subsystem and the battery pack can implement heat transfer from the heating apparatus to the battery pack via the pipeline subsystem under the condition that the heating apparatus is in operating state and the temperature of the heating apparatus is higher than the battery pack temperature.

In some embodiments, the heating apparatus includes a switch module, an energy storage unit, and a cooling unit, where the switch module and the energy storage unit are electrically connected to each other, and the switch module and the energy storage unit are both in thermal contact with the cooling unit, such that both the switch module and the energy storage unit are capable of transferring heat to the cooling unit. The electrical connection between the switch module and the energy storage unit can realize the heating function of the heating apparatus and thus realize the heating of the battery pack. The thermal contact between the switch module and the cooling unit and the thermal contact between the energy storage unit and the cooling unit provide effective heat dissipation for the switch module and the energy storage unit.

In some embodiments, the heating apparatus further includes a voltage regulator module, where the voltage regulator module is electrically connected to the switch module and is in thermal contact with the cooling unit, such that the voltage regulator module is capable of transferring heat to the cooling unit. The voltage regulator module can regulate voltage of the heating apparatus. In addition, the thermal contact between the voltage regulator module and the cooling unit can provide effective heat dissipation for the voltage regulator module.

In some embodiments, the pipeline subsystem includes a battery pack heat exchanger, a heating apparatus heat exchanger, a first pump, a second pump, a first three-way pipe, a second three-way pipe, a first three-way valve, a second three-way valve, and a heat exchanger; where the battery pack heat exchanger is in thermal contact with the battery pack, and the heating apparatus heat exchanger is in thermal contact with the heating apparatus; the first three-way pipe and the second three-way pipe each include a first port, a second port, and a third port, and the first three-way valve and the second three-way valve each include a common valve port, a first valve port, and a second valve port; a medium outflow port of the heating apparatus heat exchanger is connected to an input port of the first pump, an output port of the first pump is connected to the first port of the first three-way pipe, the second port of the first three-way pipe is connected to a port of the heat exchanger, another port of the heat exchanger is connected to the common valve port of the second three-way valve, the second valve port of the second three-way valve is connected to an input port of the second pump, an output port of the second pump is connected to a medium inflow port of the battery pack heat exchanger, a medium outflow port of the battery pack heat exchanger is connected to the first port of the second three-way pipe, and the second port of the second three-way pipe is connected to a medium inflow port of the heating apparatus heat exchanger; and the third port of the first three-way pipe is connected to the second valve port of the first three-way valve, the third port of the second three-way pipe is connected to the common valve port of the first three-way valve, and the first valve port of the second three-way valve is connected to the first valve port of the first three-way valve. By providing the pipeline subsystem including the pumps, the three-way pipes, the three-way valves, and the heat exchanger, a set of pipelines for implementing different thermal management modes for different application scenarios can be formed, thereby reducing thermal management costs.

In some embodiments, the pipeline subsystem includes a heat exchange medium circulating therein, where the heat exchange medium is a mixed solution of ethylene glycol and water; and the pipeline subsystem further includes an expansion tank disposed between the first three-way pipe and the heat exchanger for storing and replenishing the mixed solution. By using the mixed solution of ethylene glycol and water as the heat exchange medium, effective heating or cooling of the heat exchange medium can be achieved, and the heat exchange efficiency between the heating apparatus and the battery pack is improved. By providing an expansion tank in the pipeline subsystem, the heat exchange medium can be stored under the condition that there is too much heat exchange medium, and the heat exchange medium can be replenished under the condition that there is not enough heat exchange medium, as needed.

In some embodiments, the thermal management system further includes: a medium outlet temperature sensor of heating apparatus heat exchanger, where the medium outlet temperature sensor of heating apparatus heat exchanger is disposed at the medium outflow port of the heating apparatus heat exchanger to measure the temperature of the heating apparatus; and a cooling module, where the cooling module is connected to the heat exchanger to cool the heat exchanger. By providing the temperature sensor at the medium outflow port of the heating apparatus heat exchanger, the temperature of the heat exchange medium flowing out of the heating apparatus heat exchanger can be measured, and measuring results can then be used for implementing different thermal management modes for different application scenarios. By connecting the cooling module to the heat exchanger, the heat exchanger can be cooled, and then the heat exchange medium in the pipeline subsystem can be cooled according to the actual application scenario.

In some embodiments, the thermal management system further includes a controller, the battery pack includes a battery management module, the heating apparatus includes a heating apparatus control unit, and the controller, the battery management module, and the heating apparatus control unit are connected to each other via a controller area network CAN; the medium outlet temperature sensor of heating apparatus heat exchanger, the first pump, the second pump, the first three-way valve, the second three-way valve, and the cooling module are connected to the controller; the battery management module measures the battery pack temperature; and the heating apparatus control unit measures temperature of at least one of the switch module and energy storage unit in the heating apparatus; where the controller controls at least one of the first pump, the second pump, the first three-way valve, the second three-way valve, and the cooling module based on data from the medium outlet temperature sensor of heating apparatus heat exchanger, the battery management module, and the heating apparatus control unit, so as to implement at least one operating mode of the thermal management system. The battery management module can measure the temperature associated with the battery pack, the heating apparatus control unit can measure the temperatures associated with components of the heating apparatus, and in turn, all the pumps, all the three-way valves, and the cooling module can be controlled by the controller connected to the battery management module and the heating apparatus control unit, thereby implementing different thermal management modes for different application scenarios.

In some embodiments, under the condition that the heating apparatus is in operating state, when the temperature of the energy storage unit measured by the heating apparatus control unit is higher than an energy storage unit temperature threshold or when the temperature of the switch module is higher than a switch module temperature threshold, the controller turns on the first pump, turns off the second pump, controls the first three-way valve to make only the first valve port communicate with the common valve port, controls the second three-way valve to make only the first valve port communicate with the common valve port, and turns on the cooling module so as to cool the heating apparatus. In this case, the thermal management system according to this embodiment of this application can be used to rapidly cool the heating apparatus when the temperature of the heating apparatus is too high, to be specific, to rapidly cool the heating apparatus and rapidly reduce the temperature of the heating apparatus.

In some embodiments, under the condition that the heating apparatus is in operating state, when the temperature of the energy storage unit measured by the heating apparatus control unit is not higher than an energy storage unit temperature threshold and the temperature of the switch module is not higher than a switch module temperature threshold, the controller further controls at least one of the first pump, the second pump, the first three-way valve, the second three-way valve, and the cooling module based on data from the medium outlet temperature sensor of heating apparatus heat exchanger and the battery management module. In this case, the thermal management system according to this embodiment of this application can be used to compare the temperature of the heat exchange medium flowing out of the heating apparatus heat exchanger with the battery pack temperature when the temperature of the heating apparatus is not too high, and to implement different thermal management modes for different application scenarios based on the comparison results.

In some embodiments, when temperature of the heat exchange medium flowing out of the heating apparatus heat exchanger, measured by the medium outlet temperature sensor of heating apparatus heat exchanger, is higher than the battery pack temperature measured by the battery management module, the controller turns on the first pump, turns on the second pump, controls the first three-way valve to make only the first valve port communicate with the common valve port, controls the second three-way valve to make only the second valve port communicate with the common valve port, and turns off the cooling module so as to transfer heat from the heating apparatus to the battery pack. In this case, the thermal management system according to this embodiment of this application can be used to achieve a large-circulating battery hydrothermal operating mode when the temperature of the heat exchange medium flowing out of the heating apparatus heat exchanger is higher than the battery pack temperature, to be specific, to achieve a heat transfer from the heating apparatus to the battery pack so as to increase the temperature of the battery pack.

In some embodiments, when temperature of the heat exchange medium flowing out of the heating apparatus heat exchanger, measured by the medium outlet temperature sensor of heating apparatus heat exchanger, is not higher than the battery pack temperature measured by the battery management module, the controller turns on the first pump, turns off the second pump, controls the first three-way valve to make only the second valve port communicate with the common valve port, controls the second three-way valve to make only the first valve port communicate with the common valve port, and turns off the cooling module so as to transfer heat from the heating apparatus to the heat exchange medium in the pipeline subsystem. In this case, the thermal management system according to this embodiment of this application can be used to achieve a small-circulating rapid hydrothermal operating mode when the temperature of the heat exchange medium flowing out of the heating apparatus heat exchanger is not higher than the battery pack temperature, to be specific, to rapidly heat the heat exchange medium and rapidly increase the temperature of the heat exchange medium.

In some embodiments, under the condition that the heating apparatus is not in operating state, when the battery pack temperature measured by the battery management module is higher than a first battery pack temperature threshold, the controller turns off the first pump, turns on the second pump, controls the first three-way valve to make only the second valve port communicate with the common valve port, controls the second three-way valve to make only the second valve port communicate with the common valve port, and turns off the cooling module so as to cool the battery pack. In this case, the thermal management system according to this embodiment of this application can be used to cool the battery when the battery pack temperature is relatively high, to be specific, to cool the battery pack and reduce the battery pack temperature.

In some embodiments, when the battery pack temperature measured by the battery management module is higher than a second battery pack temperature threshold, the controller turns off the first pump, turns on the second pump, controls the first three-way valve to make only the second valve port communicate with the common valve port, controls the second three-way valve to make only the second valve port communicate with the common valve port, and turns on the cooling module so as to cool the battery pack. In this case, the thermal management system according to this embodiment of this application can be used to rapidly cool the battery when the battery pack temperature is too high, to be specific, to rapidly cool the battery pack and rapidly reduce the battery pack temperature.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

Persons of ordinary skill in the art can clearly understand various other advantages and benefits by reading the detailed description of the preferred embodiments below. The accompanying drawings are merely intended to illustrate the preferred embodiments and are not intended to limit this application. Moreover, throughout the accompanying drawings, the same reference signs represent the same parts. In the accompanying drawings.

Figure 1:
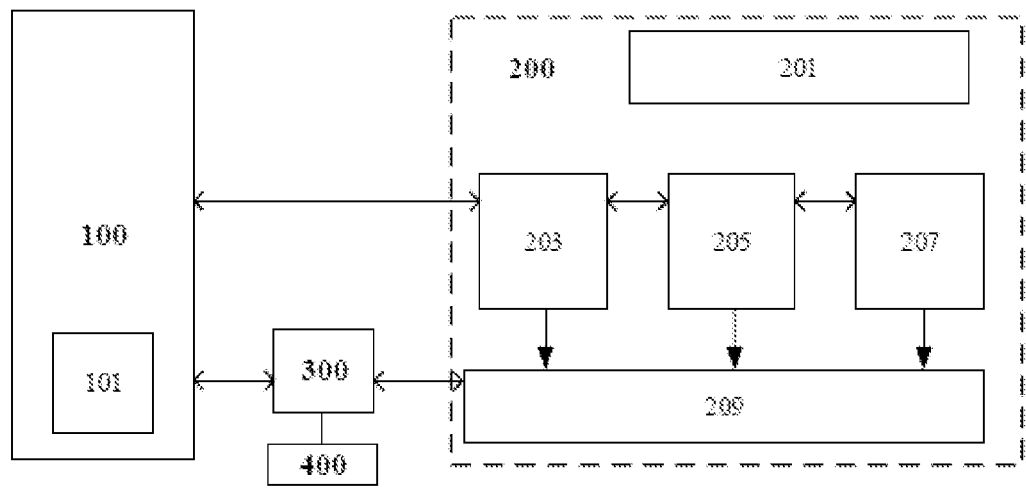
FIG. 1 is a schematic diagram of a thermal management system according to some embodiments of this application.

Reference signs in the specific embodiments are described as follows:

battery pack 100;
heating apparatus 200;
pipeline subsystem 300;
controller 400;
battery pack heat exchanger 110;
heating apparatus heat exchanger 210;
battery management module 101;
heating apparatus control unit 201;
voltage regulator module 203;
switch module 205;
energy storage unit 207;
cooling unit 209;
first pump 301;
second pump 302;
first three-way pipe 303;
second three-way pipe 304;
first three-way valve 305;
second three-way valve 306;
heat exchanger 307;
expansion tank 308;
medium outlet temperature sensor of battery pack heat exchanger 111;
medium inlet temperature sensor of battery pack heat exchanger 112;
medium outlet temperature sensor of heating apparatus heat exchanger 211; and
cooling module 311.

DETAILED DESCRIPTION

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In the description of the embodiments of this application, the terms "first", "second", and the like are merely intended to distinguish between different objects, and shall not be understood as any indication or implication of relative importance or any implicit indication of the number, sequence or primary-secondary relationship of the technical features indicated. In the description of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this application, the term "a plurality of" means more than two (inclusive).

Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal" "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of the description of the embodiments of this application rather than indicating or implying that the apparatuses or components mentioned must have specific orientations, or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or an electrical connection, and may refer to a direct connection, an indirect connection via an intermediate medium, an internal communication between two elements, or an interaction between two elements. Persons of ordinary skill in the art can understand specific meanings of these terms in this application as appropriate to specific situations.

With the development of new energy technologies, the battery pack as a power source is more widely used. The performance of the battery pack is affected by the use environment, especially by the ambient temperature. For example, in a low temperature environment (for example, −10° C., −20° C., or below −20° C.), the performance of the battery pack may be reduced to some degree relative to that in a room temperature environment (for example, 20° C.). For example, the maximum usable capacity of the battery pack may drop by 10% to 20%.

To overcome the adverse effects of the low temperature environment on the battery pack, various technologies can be used to heat the battery pack.

For example, the battery pack can be heated by using an external heating method (for example, a hydrothermal method using a heating film). The external heating method requires heat transfer among a heat source, a medium, and a heating target, resulting in a long transfer process, great loss, and low overall efficiency.

Alternatively, the battery pack can be heated by using an internal heating method (for example, producing heat directly inside the battery pack by placing an impedance element in the battery pack structure). The internal heating method requires current to flow through conductors and impedance elements inside the battery pack, resulting in great heat loss, and as a duration becomes longer, greater heat loss is produced, resulting in heat waste.

In addition, heating the battery pack also has energy consumption problems. In other words, the energy consumed for heating the battery pack comes directly or indirectly from the power of the battery pack. If the energy consumed for heating the battery pack can be reduced, it means that more energy can be used for driving the electric vehicle, and thus the range of the electric vehicle can be increased.

In addition, improving the heating effect on the battery pack and improving the heating efficiency will inevitably lead to an increase in cost, and this increase in cost usually does not match the improvement in heating effect and the increase in heating efficiency, in other words, the heating gain does not match the cost input. Therefore, from the cost perspective, it may be more reasonable to allow some of the heating heat to be dissipated.

Based on the foregoing considerations, to overcome or alleviate the problems of low efficiency and high costs of thermal management, the inventors, after research, have proposed a thermal management system including a battery pack, a heating apparatus, and a pipeline subsystem, where the heating apparatus is electrically connected to the battery pack, and the heating apparatus and the battery pack are both in thermal contact with the pipeline subsystem including a heat exchange medium. Such thermal management system can implement heat transfer from the heating apparatus to the battery pack.

In such thermal management system, on the one hand, the heating apparatus is electrically connected to the battery pack such that the heating apparatus can heat the battery pack by applying current to the battery pack, and on the other hand, the battery pack and the heating apparatus are in thermal contact with the pipeline subsystem such that heat transfer from the heating apparatus to the battery pack can be implemented by using the heat exchange medium in the pipeline subsystem. Therefore, based on the heat transfer from the heating apparatus to the battery pack implemented by using the pipeline subsystem, the thermal management system according to the embodiments of this application can utilize the heat that may be dissipated by the heating apparatus in different thermal management modes, thereby improving the thermal management efficiency and reducing the thermal management costs.

The thermal management system according to the embodiments of this application can be applied to various electric apparatuses, for example, but not limited to, cell phones, tablets, notebook computers, electric toys, electric tools, battery bicycles, electric vehicles, ships, and spacecraft. Electric vehicles include battery electric vehicles, hybrid electric vehicles utilizing electric power, extended-ranged electric vehicles, and the like. The thermal management system according to the embodiments of this application can improve the thermal management efficiency and reduce the thermal management costs of the electric apparatus.

FIG. 1 is a schematic diagram of a thermal management system according to some embodiments of this application.

An embodiment of this application provides a thermal management system. The thermal management system includes a battery pack 100, a heating apparatus 200, and a pipeline subsystem 300. The heating apparatus 200 is electrically connected to the battery pack 100, such that the heating apparatus 200 is capable of heating the battery pack 100 by applying current to the battery pack 100. The pipeline subsystem 300 includes a heat exchange medium capable of flowing therein. The pipeline subsystem 300 is in thermal contact with the heating apparatus 200 and the battery pack 100, such that the heating apparatus 200 can transfer heat to the battery pack 100 through the heat exchange medium.

In this embodiment of this application, the thermal management system is formed by the battery pack 100, the heating apparatus 200, and the pipeline subsystem 300.

Examples of the battery pack 100 include a traction battery pack provided in an electric vehicle, where the traction battery pack is capable of supplying energy to the electric vehicle. The heating apparatus 200 is electrically connected to the battery pack 100, for example, electrically connected to positive and negative electrodes of the battery pack 100, such that the battery pack 100 can be heated by applying current to the battery pack 100 by using various components of the heating apparatus 200 (see details below). Examples of the heating apparatus 200 include a heating box electrically connected to the battery pack 100, and also include other forms of heating apparatus capable of heating the battery pack 100. The pipeline subsystem 300 is in thermal contact with both the heating apparatus 200 and the battery pack 100.

A voltage used for the electrical connection between the heating apparatus 200 and the battery pack 100 may be hundreds of volts of direct current. It should be understood by those skilled in the art that this is merely an exemplary description of the electrical connection and does not constitute any limitation on the present invention, and that other forms of voltage capable of heating the battery pack 100 are within the scope of the present invention.

Through the thermal contact between the battery pack 100 and the pipeline subsystem 300 and the thermal contact between the heating apparatus 200 and the pipeline subsystem 300, the heat exchange between the heating apparatus 200 and the battery pack 100, for example, heat transfer from the heating apparatus 200 to the battery pack 100, can be implemented using the heat exchange medium flowing in the pipeline subsystem 300. In this way, the heat that may be dissipated by the heating apparatus 200 can be utilized, thereby improving the thermal management efficiency.

For the purposes of this specification, thermal contact is a state of contact in which two components or two apparatuses can adequately transfer heat. For example, in the embodiments described below, the battery pack 100 is in thermal contact with the battery pack heat exchanger 110 (for example, the heat exchanger may be a heat exchanger plate or the like depending on an actual application scenario) of the pipeline subsystem 300, thereby enabling adequate heat transfer therebetween.

In addition, depending on an actual application scenario, the heat exchange medium flowing in the pipeline subsystem 300 can be heated or cooled, for example, by the heating apparatus 200 or the cooling module 311 described below, such that the heat exchange efficiency can be improved.

According to some embodiments of this application, optionally, still referring to FIG. 1, the heating apparatus 200 includes a switch module 205, an energy storage unit 207, and a cooling unit 209. The switch module 205 and the energy storage unit 207 are electrically connected to each other, and the switch module 205 and the energy storage unit 207 are both in thermal contact with the cooling unit 209, thereby enabling both the switch module 205 and the energy storage unit 207 to transfer heat to the cooling unit 209.

In these embodiments of this application, the switch module 205 may include a semiconductor switch device (for example, an insulated gate bipolar transistor IGBT), and the energy storage unit 207 may include an inductor, where the inductor is electrically connected to the semiconductor switch device. The heating apparatus 200 includes a heating apparatus control unit 201 (see description below) for controlling the switch module 205, for example, controlling the on/off of the semiconductor switch device, so as to control a current applied to the battery pack 100 from the energy storage unit 207, and thus control the heating of the battery pack 100 by the heating apparatus 200.

The thermal contact between the cooling unit 209 and the switch module 205 and the thermal contact between the cooling unit 209 and the energy storage unit 207 may be direct contact or may be indirect contact through a heat conducting component and/or a heat conducting medium. The cooling unit 209 can be used to provide effective heat dissipation for the switch module 205 and the energy storage unit 207 through the thermal contact between the switch module 205 and the cooling unit 209 and the thermal contact between the energy storage unit 207 and the cooling unit 209.

According to some embodiments of this application, optionally, still referring to FIG. 1, the heating apparatus 200 further includes a voltage regulator module 203. The voltage regulator module 203 is electrically connected to the switch module 205 and is in thermal contact with the cooling unit 209, such that the voltage regulator module 203 can transfer heat to the cooling unit 209.

The voltage regulator module 203 may include a capacitor. In these embodiments of this application, the voltage regulator module 203 is electrically connected to the battery pack 100, for example, electrically connected to positive and negative electrodes of the battery pack 100, thereby regulating the voltage output from the heating apparatus 200 to the battery pack 100. In addition, the cooling unit 209 can be used to provide effective heat dissipation for the voltage regulator module 203 through the thermal contact between the voltage regulator module 203 and the cooling unit 209.

Figure 2:
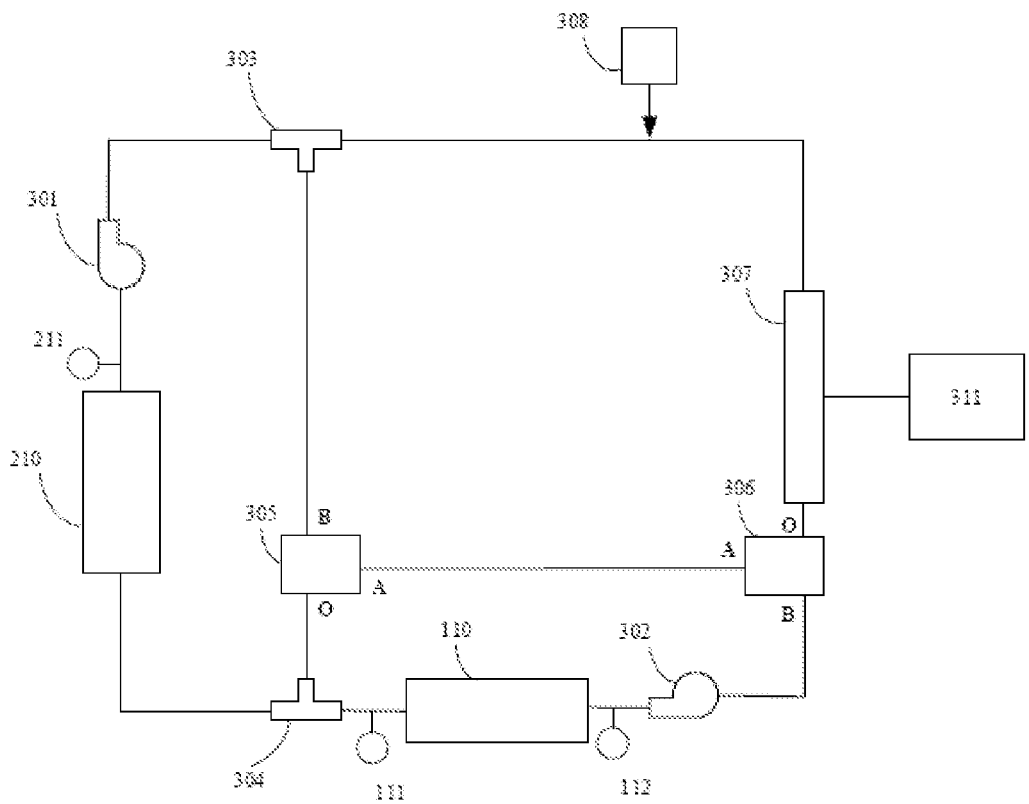
FIG. 2 is a schematic connection diagram of a pipeline subsystem of a thermal management system according to some embodiments of this application.

FIG. 2 is a schematic connection diagram of a pipeline subsystem of a thermal management system according to some embodiments of this application.

According to some embodiments of this application, optionally, referring to FIG. 2, the pipeline subsystem includes a battery pack heat exchanger 110, a heating apparatus heat exchanger 210, a first pump 301, a second pump 302, a first three-way pipe 303, a second three-way pipe 304, a first three-way valve 305, a second three-way valve 306, and a heat exchanger 307. The battery pack heat exchanger 110 is in thermal contact with the battery pack 100, and the heating apparatus heat exchanger 210 is in thermal contact with the heating apparatus 200; the first three-way pipe 303 and the second three-way pipe 304 each include a first port, a second port, and a third port, and the first three-way valve 305 and the second three-way valve 306 each include a common valve port O, a first valve port A, and a second valve port B; a medium outflow port of the heating apparatus heat exchanger 210 is connected to an input port of the first pump 301, an output port of the first pump 301 is connected to the first port of the first three-way pipe 303, the second port of the first three-way pipe 303 is connected to a port of the heat exchanger 307, another port of the heat exchanger 307 is connected to the common valve port of the second three-way valve 306, the second valve port of the second three-way valve 306 is connected to an input port of the second pump 302, an output port of the second pump 302 is connected to a medium inflow port of the battery pack heat exchanger 110, a medium outflow port of the battery pack heat exchanger 110 is connected to the first port of the second three-way pipe 304, and the second port of the second three-way pipe 304 is connected to a medium inflow port of the heating apparatus heat exchanger 210; and the third port of the first three-way pipe 303 is connected to the second valve port of the first three-way valve 305, the third port of the second three-way pipe 304 is connected to the common valve port of the first three-way valve 305, and the first valve port of the second three-way valve 306 is connected to the first valve port of the first three-way valve 305.

In these embodiments of this application, the battery pack heat exchanger 110 and the heating apparatus heat exchanger 210 are in thermal contact with the battery pack 100 and the heating apparatus 200, respectively. Depending on an actual application scenario of this application, the battery pack heat exchanger 110 and the heating apparatus heat exchanger 210 each may be a heat exchanger plate. For example, the heat exchanger plate is provided above or below the battery pack 100 in close contact with the upper or lower surface of the battery pack 100, thereby enabling adequate heat transfer between the heat exchanger plate and the battery pack 100.

It should be understood by those skilled in the art that the heat exchanger plate described herein is merely an example and does not constitute any limitation on the scope of the present invention. Depending on an actual application scenario of the present invention, those skilled in the art may use any other heat exchangers in other forms that implement the conception of the present invention, such as a heat exchanger that wraps all or part of the battery pack 100 (or the heating apparatus 200).

In these embodiments of this application, the first pump 301 and the second pump 302 may be pumps capable of using energy (for example, using energy from the battery pack) to drive the heat exchange medium in the pipeline subsystem 300, for example, water pumps.

In these embodiments of this application, the first three-way pipe 303 and the second three-way pipe 304 are disposed in the pipeline subsystem 300, and the first three-way pipe 303 and the second three-way pipe 304 each have the same three ports.

In these embodiments of this application, the first three-way valve 305 and the second three-way valve 306 are both electronic three-way valves, and the first three-way valve 305 and the second three-way valve 306 each include a common valve port, a first valve port, and a second valve port. Both the first three-way valve 305 and the second three-way valve 306 are controlled by the controller 400 described below, such that the first three-way valve 305 and the second three-way valve 306 each can switch between a first state and a second state based on a control signal from the controller 400. In the first state, the common valve port is connected to the first valve port, and the second valve port is disconnected from both the common valve port and the first valve port; and in the second state, the common valve port is connected to the second valve port, and the first valve port is disconnected from both the common valve port and the first valve port. In other words, based on the control signal from the controller 400, the first three-way valve 305 can switch between the first state in which its common valve port is only in contact with its first valve port and the second state in which its common valve port is only in contact with its second valve port. Similarly, the second three-way valve 306 can also switch between the first state in which its common valve port is only in contact with its first valve port and the second state in which its common valve port is only in contact with its second valve port.

It should be understood by those skilled in the art that the first three-way valve 305 and the second three-way valve 306 each including a common valve port, a first valve port, and a second valve port described herein are merely examples and do not constitute any limitation on the scope of the present invention. Depending on an actual application scenario of the present invention, those skilled in the art may use any other three-way valves in other forms that implement the conception of the present invention.

In these embodiments of this application, the heat exchanger 307 can enable the heat exchange medium in the pipeline subsystem 300 to transfer heat and exchange heat with the external environment or other components (for example, the cooling module described below).

It should be understood by those skilled in the art that the connection forms of the heat exchanger, the pumps, the three-way pipes, the three-way valves, and the heat exchanger in the foregoing embodiments are only examples and do not constitute any limitation on the scope of the present invention. Depending on an application scenario of the present invention, those skilled in the art may use any other components and connection forms thereof that implement the conception of the present invention.

By providing the pipeline subsystem 300 including the heat exchanger, the pumps, the three-way pipes, the three-way valves, and the heat exchanger, a set of pipelines for implementing different thermal management modes for different application scenarios can be formed, thereby reducing thermal management costs.

According to some embodiments, optionally, the pipeline subsystem 300 includes a heat exchange medium circulating therein, where the heat exchange medium is a mixed solution of ethylene glycol and water; and the pipeline subsystem 300 further includes an expansion tank 308 disposed between the first three-way pipe 303 and the heat exchanger 307 for storing and replenishing the mixed solution.

In these embodiments of this application, the expansion tank 308 is configured to accommodate the heat exchange medium such as the mixed solution of ethylene glycol and water. By providing an expansion tank 308 in the pipeline subsystem 300, the heat exchange medium can be stored under the condition that there is too much heat exchange medium, and the heat exchange medium can be replenished under the condition that there is not enough heat exchange medium, as needed. The position of the expansion tank 308 disposed in the pipeline subsystem 300 is merely an example and does not constitute any limitation on the present invention.

In these embodiments of this application, the heat exchange medium is used for implementing heat exchange between the battery pack 100 and the heating apparatus 200 and between other components. The inventors have found that using the mixed solution of ethylene glycol and water as the heat exchange medium can balance the cost, heat exchange performance, maintainability, and the like. However, it should be understood by those skilled in the art that the foregoing composition of the heat exchange medium is merely an example and does not constitute any limitation on the present invention. By using the mixed solution of ethylene glycol and water as the heat exchange medium, effective heating or cooling of the heat exchange medium can be achieved, and the heat exchange efficiency between the heating apparatus and the battery pack is improved.

According to some embodiments of this application, optionally, referring to FIG. 2, the thermal management system further includes: a medium outlet temperature sensor of heating apparatus heat exchanger 211, where the medium outlet temperature sensor of heating apparatus heat exchanger 211 is disposed at the medium outflow port of the heating apparatus heat exchanger 210 to measure temperature of the heat exchange medium flowing out of the heating apparatus heat exchanger 210; and a cooling module 311, where the cooling module 311 is connected to the heat exchanger 307 to cool the heat exchanger 307.

In these embodiments of this application, the medium outlet temperature sensor of heating apparatus heat exchanger 211 may be a sensor capable of sensing temperature and converting the sensed temperature into an output signal, for example, a contact temperature sensor (resistance temperature sensor and the like) and a non-contact temperature sensor (radiation temperature sensor and the like). In these embodiments of this application, the cooling module 311 may be a cooling component of an automotive air conditioning system, and thus is able to take away heat from the heat exchanger 307 after start-up. Therefore, using the cooling component of the automotive air conditioning system as the cooling module 311 can reduce the thermal management costs.

By providing a temperature sensor at the medium outflow port of the heating apparatus heat exchanger 210, the temperature of the heat exchange medium flowing out of the heating apparatus heat exchanger 210 can be measured, and measuring results can then be used for implementing different thermal management modes for different application scenarios. The heat exchanger 307 can be cooled by using the cooling module 311 connected to the heat exchanger 307.

Figure 3:
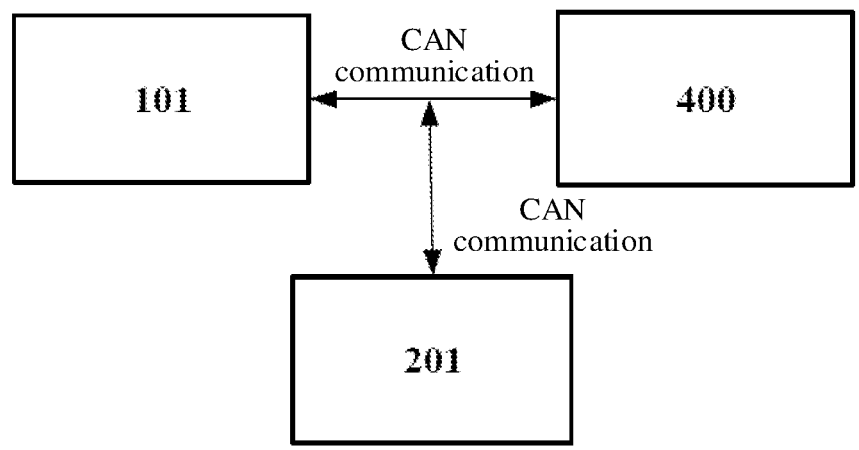
FIG. 3 is a schematic control diagram of a thermal management system according to some embodiments of this application.

FIG. 3 is a schematic control diagram of a thermal management system according to some embodiments of this application.

According to some embodiments of this application, optionally, referring to FIG. 3, the thermal management system further includes a controller 400, the battery pack 100 includes a battery management module 101, the heating apparatus 200 includes a heating apparatus control unit 201, and the controller 400, the battery management module 101, and the heating apparatus control unit 201 are connected to each other via a controller area network (CAN); the medium outlet temperature sensor of heating apparatus heat exchanger 211, the first pump 301, the second pump 302, the first three-way valve 305, the second three-way valve 306, and the cooling module 311 are connected to the controller 400; the battery management module 101 measures the battery pack temperature; and the heating apparatus control unit 201 measures temperature of at least one of the switch module 205 and energy storage unit 207 in the heating apparatus 200; where the controller 400 controls at least one of the first pump 301, the second pump 302, the first three-way valve 305, the second three-way valve 306, and the cooling module 311 based on data from the medium outlet temperature sensor of heating apparatus heat exchanger 211, the battery management module 101, and the heating apparatus control unit 201, so as to implement at least one operating mode of the thermal management system.

In these embodiments of this application, the controller 400 may be a separate controller or may be integrated into the system of the vehicle. The battery management module 101 may be the battery management system (BMS) or a component of the vehicle. The heating apparatus control unit 201 is configured to detect and control the components (for example, the voltage regulator module 203, the switch module 205, and the energy storage unit and cooling unit 209 that integrally disposed) of the heating apparatus 200. It should be understood by those skilled in the art that the CAN is merely an example of the form of connection among the controller 400, the battery management module 101, and the heating apparatus control unit 201 and does not constitute any limitation on the present invention. Depending on an actual application scenario, other wired/wireless connection networks or protocols can also be used.

The battery management module 101 can measure the temperature associated with the battery pack 100, the heating apparatus control unit 201 can measure the temperatures associated with components of the heating apparatus 200, and in turn, all the pumps, all the three-way valves, and the cooling module can be controlled by the controller 400 connected to the battery management module 101 and the heating apparatus control unit 201, thereby implementing different thermal management modes for different application scenarios.

Figure 4:
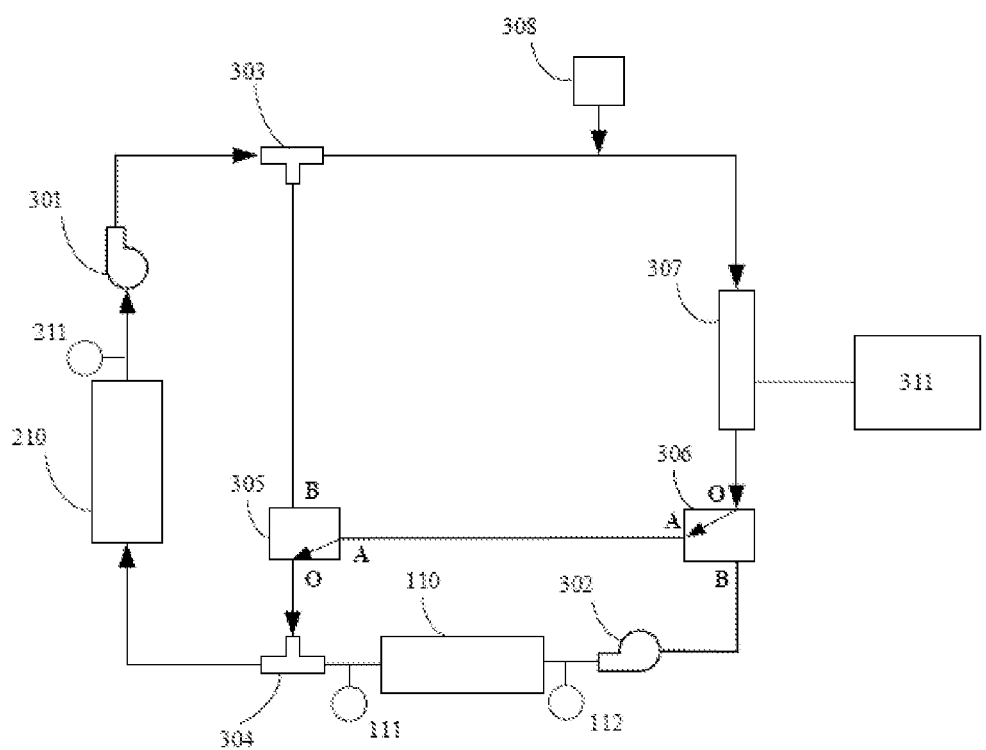
FIG. 4 is a schematic diagram of a first operating mode of a thermal management system according to some embodiments of this application.

FIG. 4 is a schematic diagram of a first operating mode of a thermal management system according to some embodiments of this application.

According to some embodiments of this application, optionally, referring to FIG. 4, under the condition that the heating apparatus 200 is in operating state, when the temperature of the energy storage unit 207 measured by the heating apparatus control unit 201 is higher than an energy storage unit temperature threshold or when the temperature of the switch module 205 is higher than a switch module temperature threshold, the controller 400 turns on the first pump 301, turns off the second pump 302, controls the first three-way valve 305 to make only the first valve port communicate with the common valve port, controls the second three-way valve 306 to make only the first valve port communicate with the common valve port, and turns on the cooling module 311 so as to cool the heating apparatus 200.

In these embodiments of this application, the heating apparatus 200 being in operating state or not can be determined by measuring current or voltage of the heating apparatus 200 by the heating apparatus control unit 201. Specifically, when the heating apparatus control unit 201 detects that the current or the voltage of the heating apparatus 200 is not zero, it is determined that the heating apparatus 200 is in operating state. Conversely, when the heating apparatus control unit 201 detects that the current and the voltage of the heating apparatus 200 are zero, it is determined that the heating apparatus 200 is not in operating state.

In these embodiments of this application, if the heating apparatus 200 and components thereof are overheated, cooling is required to prevent damage.

In this case, the thermal management system according to these embodiments of this application can be used to cool the heating apparatus 200 when temperature of a component of the heating apparatus 200 is relatively high to reduce the temperature of the heating apparatus 200, so as to implement the first operating mode, that is, the "cooling the heating apparatus" operating mode.

For example, the energy storage unit temperature threshold may be 140° C., and the switch module temperature threshold may be 100° C.; when the temperature of the energy storage unit 207 measured by the heating apparatus control unit 201 is higher than 140° C. or the temperature of the switch module 205 is higher than 100° C., the controller 400 controls to enter the "cooling the heating apparatus" operating mode.

In these embodiments of this application, alternatively, the temperature of the voltage regulator module 203 can be measured. For example, under the condition that a temperature threshold of the voltage regulator module is 85° C., when the temperature of the voltage regulator module 203 measured by the heating apparatus control unit 201 is higher than 85° C., the controller 400 can control to enter the "cooling the heating apparatus" operating mode.

In addition, under the condition that the heating apparatus 200 is in operating state, when the temperature of the energy storage unit 207 measured by the heating apparatus control unit 201 is not higher than an energy storage unit temperature threshold and the temperature of the switch module 205 is not higher than a switch module temperature threshold, the controller 400 further controls at least one of the first pump 301, the second pump 302, the first three-way valve 305, the second three-way valve 306, and the cooling module 311 based on data from the medium outlet temperature sensor of heating apparatus heat exchanger 211 and the battery management module 101.

Figure 5:
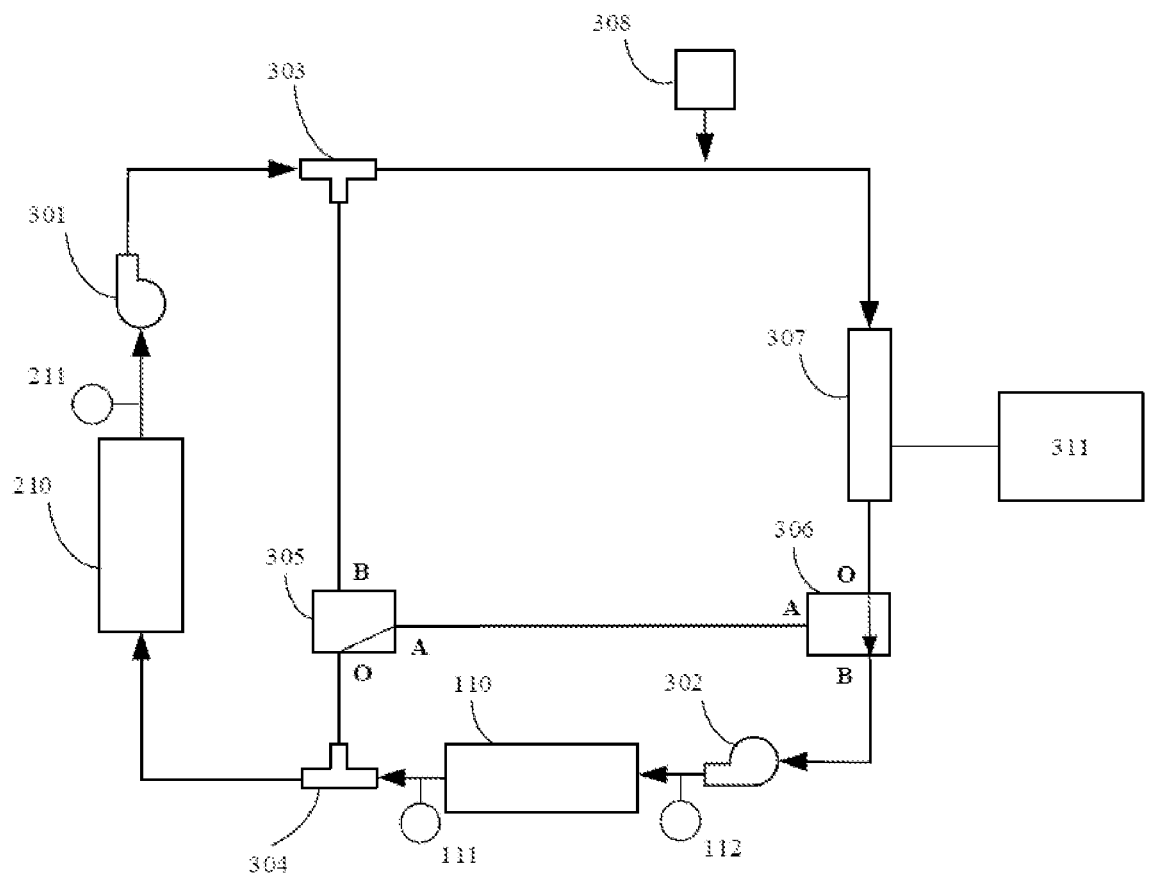
FIG. 5 is a schematic diagram of a second operating mode of a thermal management system according to some embodiments of this application.

FIG. 5 is a schematic diagram of a second operating mode of a thermal management system according to some embodiments of this application.

According to some embodiments of this application, optionally, referring to FIG. 5, when temperature of the heat exchange medium flowing out of the heating apparatus heat exchanger 210, measured by the medium outlet temperature sensor of heating apparatus heat exchanger 211, is higher than the battery pack temperature measured by the battery management module 101, the controller 400 turns on the first pump 301, turns on the second pump 302, controls the first three-way valve 305 to make only the first valve port communicate with the common valve port, controls the second three-way valve 306 to make only the second valve port communicate with the common valve port, and turns off the cooling module 311 so as to transfer heat from the heating apparatus 200 to the battery pack 100.

In these embodiments of this application, when the ambient temperature is low in winter, the performance of the battery pack 100 may be decreased to some extent and therefore the battery pack 100 needs to be heated. If the temperature of the heat exchange medium is appropriate, for example, the temperature of the heat exchange medium flowing out of the heating apparatus heat exchanger 210 is higher than the temperature of the battery pack 100, the heat transfer from the heating apparatus 200 to the battery pack 100 can be implemented using the heat exchange medium in the pipeline subsystem 300.

In this case, the thermal management system according to these embodiments of this application can be used to make the heat exchange medium pass through both the battery pack heat exchanger 110 and the heating apparatus heat exchanger 210 when the battery pack 100 needs to be heated, such that the heat transfer from the heating apparatus 200 to the battery pack 100 can be carried out with a relatively large medium circulation loop, so as to increase the temperature of the battery pack 100, implementing the second operating mode, that is, the "large-circulating battery hydrothermal" operating mode.

Figure 6:
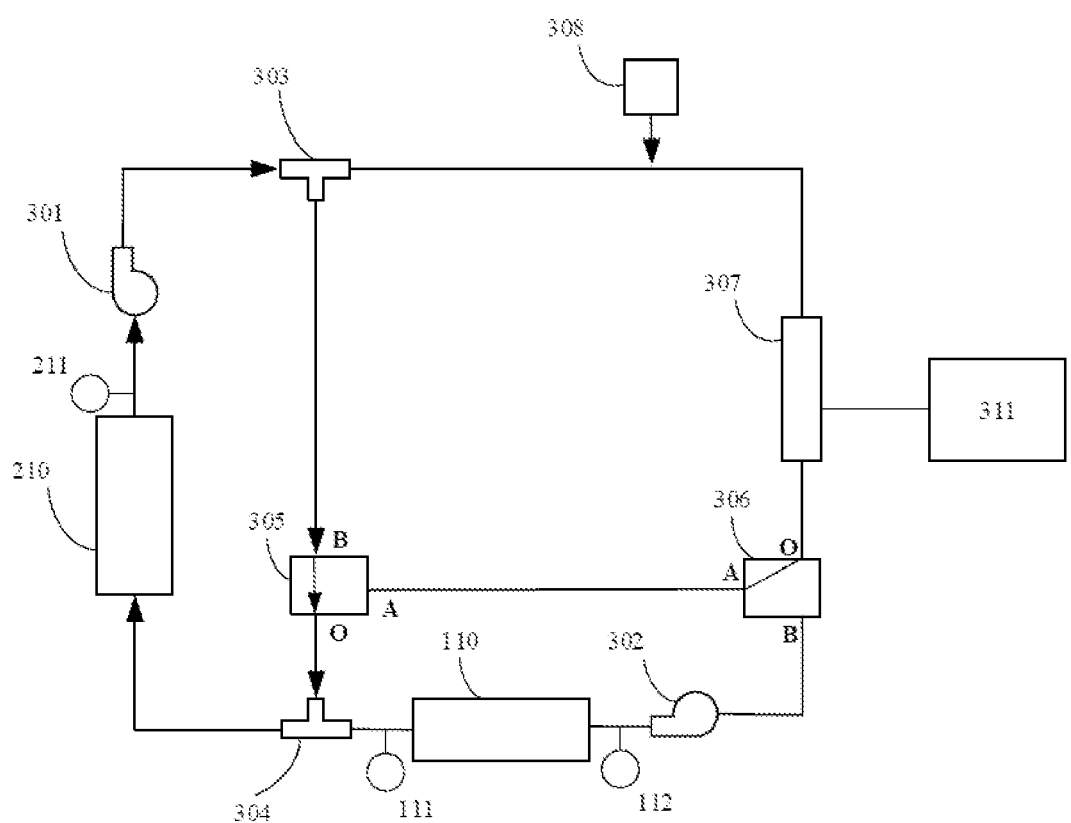
FIG. 6 is a schematic diagram of a third operating mode of a thermal management system according to some embodiments of this application.

FIG. 6 is a schematic diagram of a third operating mode of a thermal management system according to some embodiments of this application.

According to some embodiments of this application, optionally, referring to FIG. 6, when temperature of the heat exchange medium flowing out of the heating apparatus heat exchanger 210, measured by the medium outlet temperature sensor of heating apparatus heat exchanger 211, is not higher than the battery pack temperature measured by the battery management module 101, the controller 400 turns on the first pump 301, turns off the second pump 302, controls the first three-way valve 305 to make only the second valve port communicate with the common valve port, controls the second three-way valve 306 to make only the first valve port communicate with the common valve port, and turns off the cooling module 311 so as to transfer heat from the heating apparatus 200 to the heat exchange medium in the pipeline subsystem 300.

In these embodiments of this application, when heating of the battery pack 100 is required, if the temperature of the heat exchange medium is not appropriate, for example, the temperature of the heat exchange medium flowing out of the heating apparatus heat exchanger 210 is not higher than the temperature of the battery pack 100, the efficiency of heat transfer from the heating apparatus 200 to the battery pack 100 is severely reduced, thus reducing the thermal management efficiency.

In this case, the thermal management system according to these embodiments of this application can be used to make the heat exchange medium not pass through the battery pack heat exchanger 110 when the battery pack 100 needs to be heated but the temperature of the heat exchange medium is not appropriate, such that the heat exchange medium can be heated with a relatively small medium circulation loop, so as to increase the temperature of the heat exchange medium, implementing the third operating mode, that is, the "small-circulating hydrothermal" operating mode.

Figure 7:
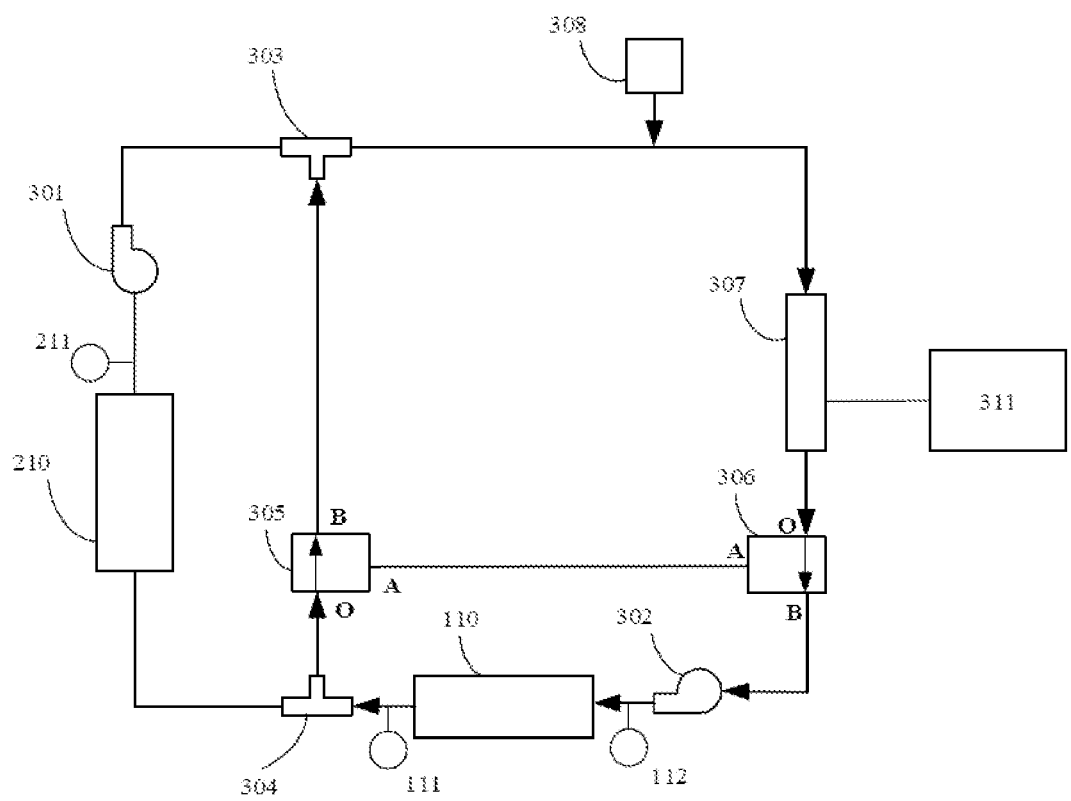
FIG. 7 is a schematic diagram of a fourth operating mode and a fifth operating mode of a thermal management system according to some embodiments of this application.

FIG. 7 is a schematic diagram of a fourth operating mode and a fifth operating mode of a thermal management system according to some embodiments of this application.

According to some embodiments of this application, optionally, referring to FIG. 7, under the condition that the heating apparatus 200 is not in operating state, when the battery pack temperature measured by the battery management module 101 is higher than a first battery pack temperature threshold, the controller 400 turns off the first pump 301, turns on the second pump 302, controls the first three-way valve 305 to make only the second valve port communicate with the common valve port, controls the second three-way valve 306 to make only the second valve port communicate with the common valve port, and turns off the cooling module 311 so as to cool the battery pack 100.

In these embodiments of this application, when the ambient temperature is high in summer, the battery pack 100 needs to be cooled to ensure the safety of the battery pack.

In this case, the thermal management system 10 according to these embodiments of this application can be used to cool the battery pack 100 when the battery pack temperature is relatively high, so as to reduce the temperature of the battery pack 100, implementing the fourth operating mode, that is, the "battery cooling" operating mode. In this mode, the heat exchange medium does not pass through the heating apparatus heat exchanger 210.

For example, the first battery pack temperature threshold may be 30° C., and when the battery pack temperature measured by the battery management module 101 is higher than the controller 400 controls to enter the "battery cooling" operating mode.

According to some embodiments of this application, optionally, still referring to FIG. 7, when the battery pack temperature measured by the battery management module 101 is higher than a second battery pack temperature threshold (the second battery pack temperature threshold is higher than the first battery pack temperature threshold), the controller 400 turns off the first pump 301, turns on the second pump 302, controls the first three-way valve 305 to make only the second valve port communicate with the common valve port, controls the second three-way valve 306 to make only the second valve port communicate with the common valve port, and turns on the cooling module 311 so as to cool the battery pack 100.

In these embodiments of this application, when the temperature of the battery pack 100 is higher, the battery pack 100 needs to be cooled rapidly to ensure the safety of the battery pack.

In this case, the thermal management system according to this embodiment of this application can be used to implement the fifth operating mode, that is, the "rapid battery cooling", when the battery pack temperature is higher, so as to rapidly cool the battery pack 100 and rapidly reduce the temperature of the battery pack 100. The difference from the fourth operating mode is that in the fifth operating mode, the controller 400 also turns on the cooling module 311 for cooling, and the cooling module 311 removes heat from the heat exchanger 307, thereby improving the heat exchange efficiency.

For example, the second battery pack temperature threshold may be 40° C., and when the battery pack temperature measured by the battery management module 101 is higher than 40° C., the controller 400 controls to enter the "rapid battery cooling" operating mode.

In addition, according to some embodiments of this application, the thermal management system may further include a medium outlet temperature sensor of battery pack heat exchanger 111 and a medium inlet temperature sensor of battery pack heat exchanger 112, which are disposed at a medium outflow port and medium inflow port of the battery pack heat exchanger 110, respectively, as shown in FIG. 2. The medium outlet temperature sensor of battery pack heat exchanger 111 and the medium inlet temperature sensor of battery pack heat exchanger 112 each may be connected to the battery management module 101, such that the measured temperature of the heat exchange medium flowing out of the battery pack heat exchanger 110 and the measured temperature of the heat exchange medium flowing into the battery pack heat exchanger 110 are sent to the battery management module 101. Persons skilled in the art may understand that any one of the temperature of the heat exchange medium flowing out of the battery pack heat exchanger 110 and the temperature of the heat exchange medium flowing into the battery pack heat exchanger 110 may be used to substitute for the battery pack temperature, depending on an actual application scenario.

Figure 8:
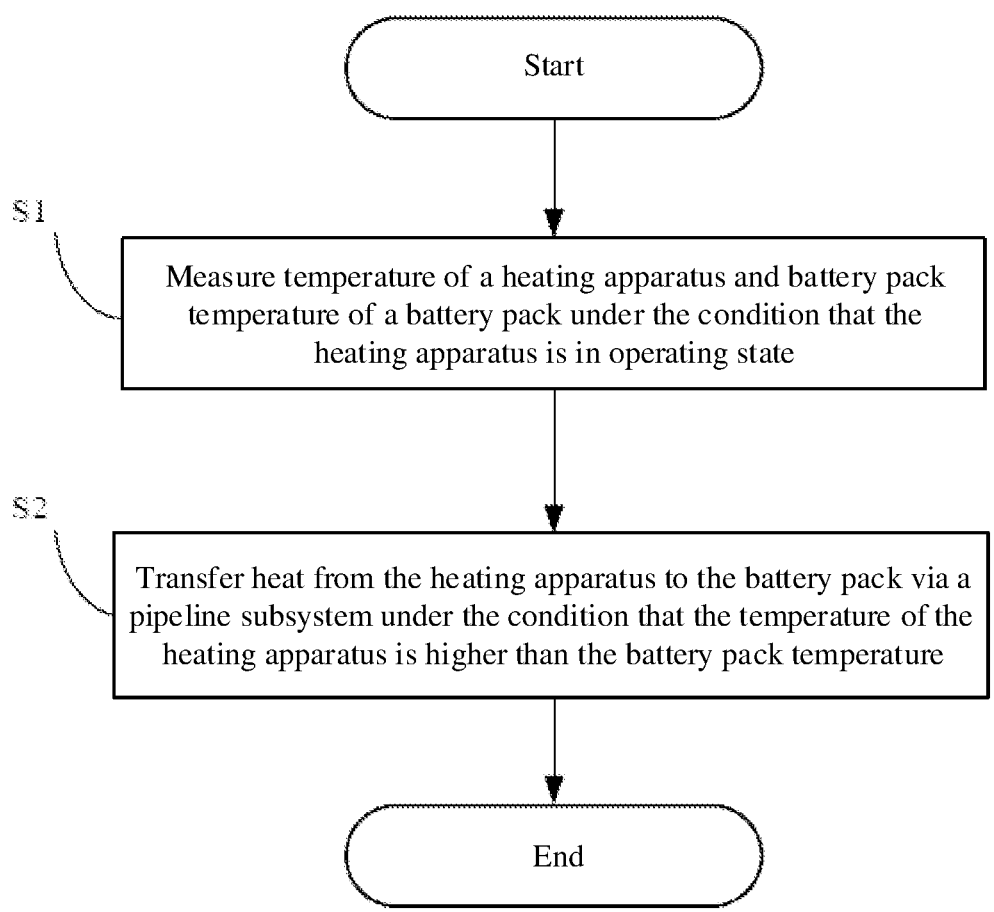
FIG. 8 is a flowchart of a thermal management method according to some embodiments of this application.

FIG. 8 is a flowchart of a thermal management method according to some embodiments of this application.

These embodiments of this application provide a thermal management method. Referring to FIG. 8, the thermal management method includes the following steps: S1: Measure temperature of a heating apparatus and battery pack temperature of a battery pack under the condition that the heating apparatus is in operating state, and S2: Transfer heat from the heating apparatus to the battery pack via a pipeline subsystem under the condition that the temperature of the heating apparatus is higher than the battery pack temperature.

In these embodiments of this application, an example of a battery pack is a traction battery pack installed in an electric vehicle for providing energy for the electric vehicle, and the heating apparatus is, for example, electrically connected to the positive and negative electrodes of the battery pack so as to heat the battery pack by applying current to the battery pack. The pipeline subsystem is in thermal contact with both the heating apparatus and the battery pack such that, for example, heat transfer from the heating apparatus to the battery pack can be implemented by using the heat exchange medium flowing in the pipeline subsystem. In this way, the heat that may be dissipated by the heating apparatus can be utilized, thereby improving the thermal management efficiency.

Figure 9:
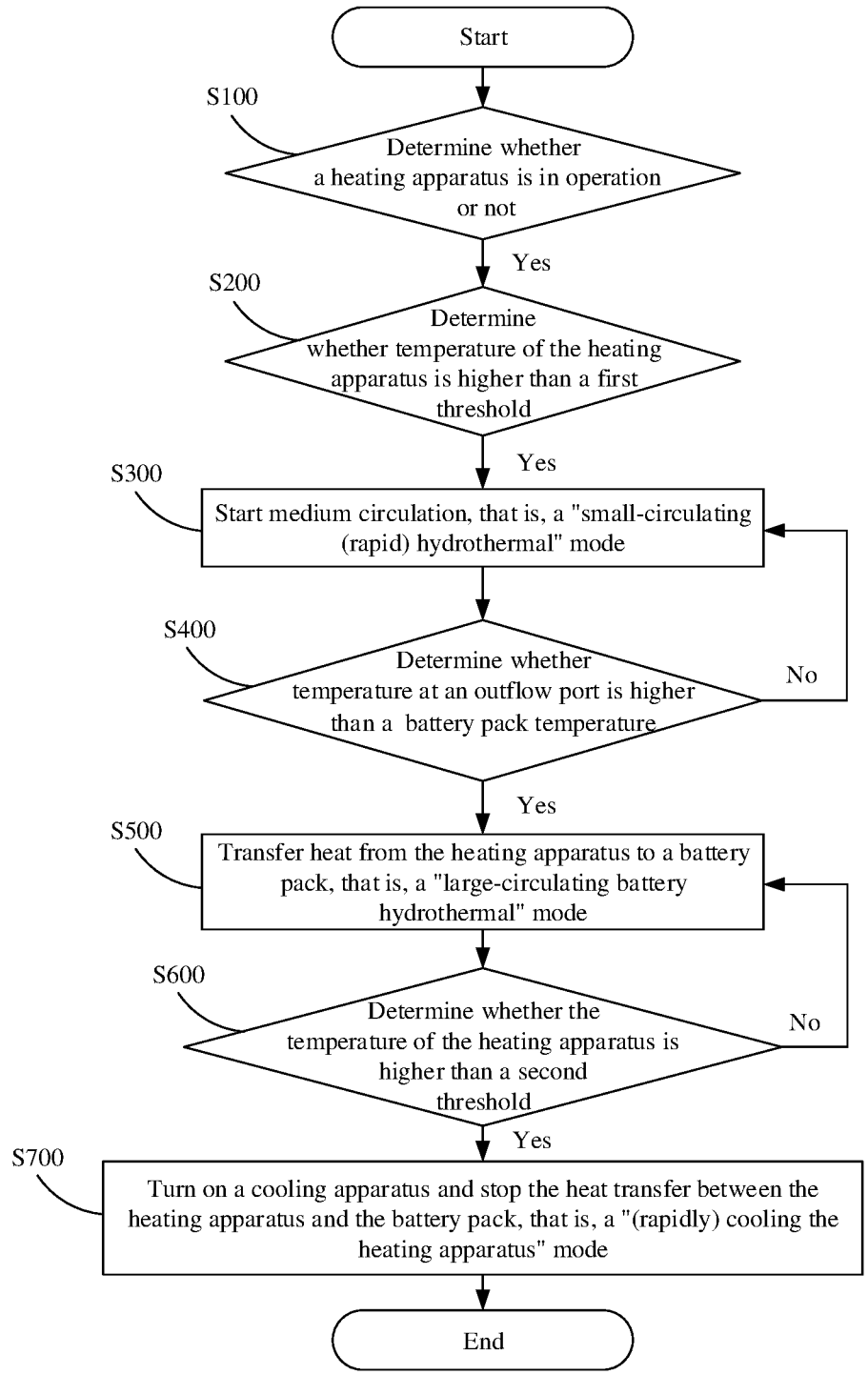
FIG. 9 is a flowchart of a thermal management method according to some embodiments of this application for implementing some of operating modes.

FIG. 9 is a flowchart of a thermal management method according to some embodiments of this application for implementing some of operating modes.

According to some embodiments of this application, in step S100, it is determined whether a heating apparatus is in operation or not. Determining whether the heating apparatus is in operation or not can be done by measuring a voltage and/or current of the heating apparatus. For example, if the current or voltage of the heating apparatus is not zero, it is determined that the heating apparatus is in operating state, and step S200 is performed.

In step S200, it is determined whether temperature of the heating apparatus is higher than a first heating apparatus temperature threshold. Measuring the temperature of the heating apparatus can be achieved by measuring temperature of one or more components of the heating apparatus, for example, by measuring temperature of one or more of a voltage regulator module, a switch module, and an energy storage unit of the heating apparatus. When the temperature of the heating apparatus is higher than the first heating apparatus temperature threshold, the temperature of the heating apparatus may be considered high enough and there is an internal heat loss of the heating apparatus. Therefore, the heat from the heating apparatus can be transferred to the heat exchange medium in the pipeline subsystem, such that the heat inside the heating apparatus can be fully used, improving the thermal management efficiency. If the temperature of the heating apparatus is higher than the first heating apparatus temperature threshold, step S300 is performed.

In step S300, medium circulation is started to transfer the heat from the heating apparatus to the heat exchange medium. The heat exchange medium in the pipeline subsystem may circulate in a manner of avoiding a battery pack heat exchanger. This can be implemented by using a controller to control pumps and three-way valves in the pipeline subsystem, which corresponds to the "small-circulating hydrothermal" operating mode described above. Preventing the heat of the heat exchange medium from being transferred to the battery pack can allow the heat from the heating apparatus to be fully transferred to the heat exchange medium, rapidly increasing the temperature of the heat exchange medium and improving the thermal management efficiency.

In step S400, it is determined whether temperature at an outflow port of the heating apparatus is higher than the battery pack temperature. To facilitate measurement, the temperature at the outflow port of the heating apparatus, that is, the temperature of the heating apparatus, may be measured at a medium outflow port of the heating apparatus heat exchanger. The battery pack temperature can be measured by the battery management module of the battery pack. If the temperature at the outflow port of the heating apparatus is higher than the battery pack temperature, step S500 is performed; otherwise, step S300 is performed again.

In step S500, the heat is transferred from the heating apparatus to the battery pack via the pipeline subsystem. This step can be implemented by using a controller to control pumps and three-way valves in the pipeline subsystem, which corresponds to the "large-circulating battery hydrothermal" operating mode described above. For heat transfer from the heating apparatus to the battery pack, the heat from the heating apparatus that is possible to be dissipated can be used to heat the battery pack so as to reduce thermal management costs.

In step S600, it is determined whether the temperature of the heating apparatus is higher than a second heating apparatus temperature threshold, where the second threshold may be higher than the first threshold. Measuring the temperature of the heating apparatus can be achieved by measuring temperature of one or more components of the heating apparatus, for example, by measuring temperature of one or more of a voltage regulator module, a switch module, and an energy storage unit of the heating apparatus. When the temperature of the heating apparatus is higher than the second heating apparatus temperature threshold, the temperature of the heating apparatus may be considered to be too high, and thus the heating apparatus needs to be cooled so as to ensure the safety of the heating apparatus. If the temperature of the heating apparatus is higher than the second heating apparatus temperature threshold, step S700 is performed.

In step S700, a cooling apparatus is turned on and the heat transfer between the heating apparatus and the battery pack is stopped. In this step, the heat exchange medium in the pipeline subsystem may circulate in a manner of avoiding the battery pack heat exchanger, and the cooling module connected to the pipeline subsystem is turned on to cool the heat exchange medium. This can be implemented by using a controller to control pumps, three-way valves, and cooling module in the pipeline subsystem, which corresponds to the "cooling the heating apparatus" operating mode described above. In this way, the heat is prevent from transferring from the battery pack to the heat exchange medium, and the heat exchange medium is cooled, such that the heat exchange medium can be fully cooled so as to rapidly reduce the temperature of the heating apparatus, improving the thermal management efficiency.

Figure 10:
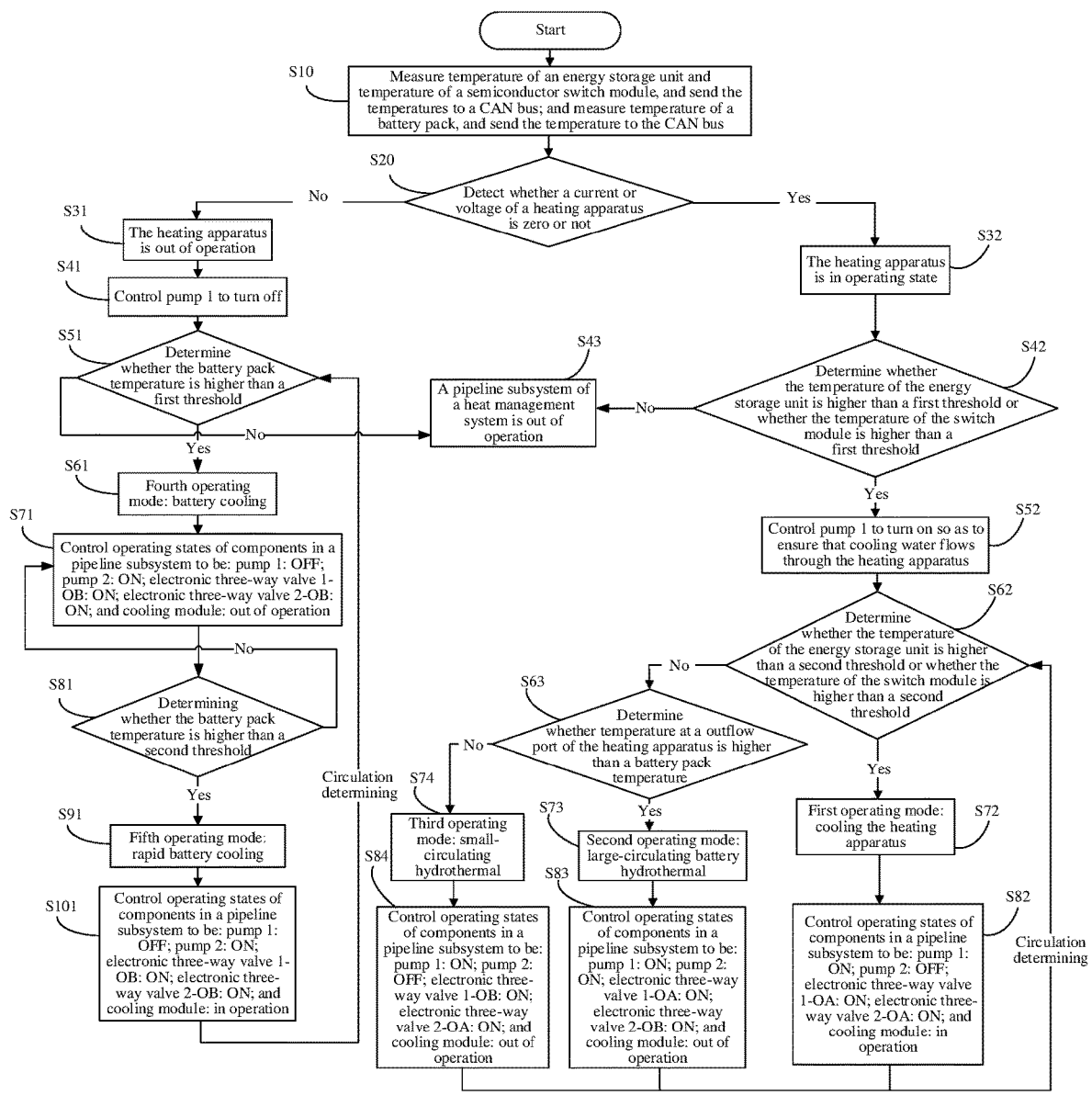
FIG. 10 is a flowchart of a thermal management method according to some embodiments of this application for implementing some of operating modes.

FIG. 10 is a flowchart of a thermal management method according to some embodiments of this application for implementing some of operating modes.

According to some embodiments of this application, optionally, in step S10, temperature of an energy storage unit and temperature of a semiconductor switch module are measured by using a heating apparatus control unit and sent to a CAN bus; and temperature of a battery pack is measured by using a battery management module and sent to the CAN bus.

In step S20, the heating apparatus control unit is used to detect whether a current or voltage of the heating apparatus is zero or not. If the current and voltage of the heating apparatus are zero, it is determined that the heating apparatus is not in operating state, and step S31 is performed. If the current or voltage of the heating apparatus is not zero, it is determined that the heating apparatus is in operating state, and step S32 is performed.

Under the condition that the heating apparatus is in operating state, in step S42, a controller is used to determine whether the temperature of the energy storage unit is higher than a first energy storage unit temperature threshold or whether the temperature of the switch module is higher than a first switch module temperature threshold. If a determining result of step S42 is no, step S43 is performed, in which a pipeline subsystem of a thermal management system is out of operation. If a determining result of step S42 is yes, step S52 is performed, in which the controller is used to control pump 1 to turn on so as to ensure that cooling water flows through the heating apparatus.

After the cooling water flows through the heating apparatus, in step S62, the controller is used to determine whether the temperature of the energy storage unit is higher than a second energy storage unit temperature threshold or whether the temperature of the switch module is higher than a second switch module temperature threshold. The second energy storage unit temperature threshold is higher than the first energy storage unit temperature threshold, and the second switch module temperature threshold is higher than the first switch module temperature threshold. If a determining result of step S62 is yes, step S72 is performed, in which the controller controls to enter a first operating mode, that is, the "cooling the heating apparatus" operating mode. In this case, in step S82, a first pump is turned on, a second pump is turned off, a first three-way valve is controlled to make only a first valve port communicate with a common valve port, a second three-way valve is controlled to make only a first valve port communicate with a common valve port, and a cooling module is turned on so as to cool the heating apparatus.

If a determining result of step S62 is no, step S63 is performed, in which the controller is used to determine whether temperature at an outflow port of the heating apparatus is higher than the battery pack temperature. If a determining result of step S63 is yes, step S73 is performed, in which the controller controls to enter a second operating mode, that is, the "large-circulating battery hydrothermal" operating mode. In this case, in step S83, a first pump is turned on, a second pump is turned on, a first three-way valve is controlled to make only a first valve port communicate with a common valve port, a second three-way valve is controlled to make only a second valve port communicate with a common valve port, and the cooling module is turned off, such that the heat from the heating apparatus can be transferred to the battery pack, and the heat transfer from the heating apparatus to the battery pack is carried out with a relatively large medium circulation loop.

If a determining result of step S63 is no, step S74 is performed, in which the controller controls to enter a third operating mode, that is, the "small-circulating hydrothermal" operating mode. In this case, in step S84, a first pump is turned on, a second pump is turned off, a first three-way valve is controlled to make only a second valve port communicate with a common valve port, a second three-way valve is controlled to make only a first valve port communicate with a common valve port, and the cooling module is turned off, such that the heat from the heating apparatus can be transferred to the heat exchange medium in the pipeline subsystem, and the heat exchange medium can be heated with a relatively small medium circulation loop.

In the first, second, and third operating modes, the controller is used for performing circulation determining for step S62, to be specific, determining whether the temperature of the energy storage unit is higher than the second energy storage unit temperature threshold or whether the temperature of the switch module is higher than the second switch module temperature threshold, and performing a corresponding process based on a determining result. Therefore, the thermal management system can be kept in an appropriate operating mode, thereby improving the thermal management efficiency.

In addition, under the condition that the heating apparatus is not in operating state, in step S41, the controller turns off the first pump. Then, in step S51, the controller is used to determine whether the battery pack temperature is higher than a first battery pack temperature threshold. If a determining result of step S51 is no, step S43 is performed, in which a pipeline subsystem of a thermal management system is out of operation.

If a determining result of step S51 is yes, step S61 is performed, in which the controller controls to enter a fourth operating mode, that is, the "battery cooling" operating mode. In this case, in step S71, a first pump is turned off, a second pump is turned on, a first three-way valve is controlled to make only a second valve port communicate with a common valve port, a second three-way valve is controlled to make only a second valve port communicate with a common valve port, and a cooling module is turned off, such that the heating apparatus is cooled by using the heat exchange medium under the condition that no heat exchange medium passes through the heating apparatus heat exchanger.

After entering in the fourth operating mode, in step S81, the controller is used to determine whether the battery pack temperature is higher than a second battery pack temperature threshold. The second battery pack temperature threshold is higher than the first battery pack temperature threshold. If a determining result of step S81 is no, still stay in the fourth operating mode, that is, the "battery cooling" operating mode. If a determining result of step S81 is yes, step S91 is performed, in which the controller controls to enter a fifth operating mode, that is, the "rapid battery cooling" operating mode. In this case, in step S101, a first pump is turned off, a second pump is turned on, a first three-way valve is controlled to make only a second valve port communicate with a common valve port, a second three-way valve is controlled to make only a second valve port communicate with a common valve port, and a cooling module is turned on, such that the heating apparatus is cooled by using the heat exchange medium under the condition that no heat exchange medium passes through the heating apparatus heat exchanger and that the cooling module is turned on.

The difference from the fourth operating mode is that in the fifth operating mode, the controller also turns on the cooling module for cooling, and the cooling module removes heat from the heat exchanger, thereby improving the heat exchange efficiency.

In the fifth operating mode, the controller is used for performing circulation determining for step S51, to be specific, determining whether the battery pack temperature is higher than a temperature threshold D, and performing a corresponding process based on a determining result. Therefore, the thermal management system can be kept in an appropriate operating mode, thereby improving the thermal management efficiency.

Persons skilled in the art can understand that the specific values (for example, temperature values) described above are merely examples and do not constitute any limitation on the scope of the present invention. Depending on an actual application scenario of the present invention, the specific values can be determined based on test data.

Therefore, according to some embodiments of this application, different thermal management modes for different application scenarios are implemented with a set of pipelines, thus reducing thermal management costs.

In conclusion, it should be noted that the above embodiments are merely intended for describing the technical solutions of this application but not for limiting this application. Although this application is described in detail with reference to the foregoing embodiments, persons of ordinary skill in the art should understand that they may still make modifications to the technical solutions described in the foregoing embodiments or make equivalent replacements to some or all technical features thereof without departing from the scope of the technical solutions of the embodiments of this application. They should all be covered in the scope of the claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. A thermal management method, applied to a thermal management system which comprises a heating apparatus, a battery pack, a cooling module and a pipeline subsystem, the pipeline subsystem being in thermal contact with the heating apparatus, the battery pack and the cooling module; wherein the heating apparatus comprises a switch module, an energy storage unit, and a cooling unit, the switch module and the energy storage unit are electrically connected to each other, both the switch module and the energy storage unit are in thermal contact with the cooling unit, and both the switch module and the energy storage unit are capable of transferring heat to the cooling unit; wherein the thermal management method comprises measuring a temperature of the battery pack and a temperature of a heat exchange medium of the pipeline subsystem; and under the condition that the temperature of the battery pack and the temperature of the heat exchange medium are under a low temperature threshold, operating the pipeline subsystem such that the heat exchange medium is circulated in the pipeline subsystem to exchange heat with the heating apparatus but not with the cooling module or the battery pack, until the temperature of the heat exchange medium reaches a predetermined threshold and the pipeline subsystem is operated such that the heat exchange medium is circulated in the pipeline subsystem to exchange heat with the battery pack and the heating apparatus; and under the condition that the temperature of the battery pack is higher than a high temperature threshold, operating the pipeline subsystem such that the heat exchange medium is circulated in the pipeline subsystem to exchange heat with the cooling module and the battery pack but not with the heating apparatus.

2. The thermal management method according to claim 1, wherein the pipeline subsystem further comprises a battery pack heat exchanger in thermal contact with the battery pack to allow the heat exchange medium to exchange heat with the battery pack and a heating apparatus heat exchanger in thermal contact with the heating apparatus to allow the heat exchange medium to exchange heat with the heating apparatus.

3. The thermal management method according to claim 2, wherein the temperature of the heating apparatus is measured at a medium outflow port of the heating apparatus heat exchanger.

4. The thermal management method according to claim 2, wherein the thermal management method further comprises: measuring the temperature of the heating apparatus; and under the condition that the measured temperature of the heating apparatus is higher than a first heating apparatus temperature threshold, causing the heat exchange medium in the pipeline subsystem to circulate in a manner of avoiding the battery pack heat exchanger.

5. The thermal management method according to claim 2, wherein the thermal management method further comprises: measuring the temperature of the heating apparatus; and under the condition that the measured temperature of the heating apparatus is higher than a second heating apparatus temperature threshold, causing the heat exchange medium in the pipeline subsystem to circulate in a manner of avoiding the battery pack heat exchanger, and turning on a cooling module connected to the pipeline subsystem to cool the heat exchange medium.

6. A thermal management system, comprising: a battery pack; a heating apparatus, a cooling apparatus; and a pipeline subsystem, wherein the pipeline subsystem is in thermal contact with the heating apparatus, the battery pack and the cooling module;

wherein the heating apparatus comprises a switch module, an energy storage unit, and a cooling unit, the switch module and the energy storage unit are electrically connected to each other, both the switch module and the energy storage unit are in thermal contact with the cooling unit, and both the switch module and the energy storage unit are capable of transferring heat to the cooling unit;

wherein the thermal management system is arranged to measure a temperature of the battery pack and a temperature of a heat exchange medium of the pipeline subsystem; and under the condition that the temperature of the battery pack and the temperature of the heat exchange medium are under a low temperature threshold, to operate the pipeline subsystem such that the heat exchange medium is circulated in the pipeline subsystem to exchange heat with the heating apparatus but not with the cooling module or the battery pack, until the temperature of the heat exchange medium reaches a predetermined threshold and to operate the pipeline subsystem such that the heat exchange medium is circulated in the pipeline subsystem to exchange heat with the battery pack and the heating apparatus; and under the condition that the temperature of the battery pack is higher than a high temperature threshold, to operate the pipeline subsystem such that the heat exchange medium is circulated in the pipeline subsystem to exchange heat with the cooling module and the battery pack but not with the heating apparatus.

7. The thermal management system according to claim 6, wherein the heating apparatus further comprises a voltage regulator module, wherein the voltage regulator module is electrically connected to the switch module and is in thermal contact with the cooling unit, wherein the voltage regulator module is capable of transferring heat to the cooling unit.

8. The thermal management system according to claim 6, wherein the pipeline subsystem comprises a battery pack heat exchanger, a heating apparatus heat exchanger, a first pump, a second pump, a first three-way pipe, a second three-way pipe, a first three-way valve, a second three-way valve, and a cooling apparatus heat exchanger; the battery pack heat exchanger is in thermal contact with the battery pack, and the heating apparatus heat exchanger is in thermal contact with the heating apparatus; the first three-way pipe and the second three-way pipe each comprise a first port, a second port, and a third port, and the first three-way valve and the second three-way valve each comprise a common valve port, a first valve port, and a second valve port; a medium outflow port of the heating apparatus heat exchanger is connected to an input port of the first pump, an output port of the first pump is connected to the first port of the first three-way pipe, the second port of the first three-way pipe is connected to a port of the cooling apparatus heat exchanger, another port of the cooling apparatus heat exchanger is connected to the common valve port of the second three-way valve, the second valve port of the second three-way valve is connected to an input port of the second pump, an output port of the second pump is connected to a medium inflow port of the battery pack heat exchanger, a medium outflow port of the battery pack heat exchanger is connected to the first port of the second three-way pipe, and the second port of the second three-way pipe is connected to a medium inflow port of the heating apparatus heat exchanger; and the third port of the first three-way pipe is connected to the second valve port of the first three-way valve, the third port of the second three-way pipe is connected to the common valve port of the first three-way valve, and the first valve port of the second three-way valve is connected to the first valve port of the first three-way valve.

9. The thermal management system according to claim 8, wherein the heat exchange medium is a mixed solution of ethylene glycol and water; and the pipeline subsystem further comprises an expansion tank disposed between the first three-way pipe and the heat exchanger for storing and replenishing the mixed solution.

10. The thermal management system according to claim 8, wherein the thermal management system further comprises: a medium outlet temperature sensor of heating apparatus heat exchanger, wherein the medium outlet temperature sensor of heating apparatus heat exchanger is disposed at the medium outflow port of the heating apparatus heat exchanger to measure the temperature of the heating apparatus.

11. The thermal management system according to claim 10, wherein the thermal management system further comprises a controller, the battery pack comprises a battery management module, the heating apparatus comprises a heating apparatus control unit, and the controller, the battery management module, and the heating apparatus control unit are connected to each other via a controller area network (CAN); the medium outlet temperature sensor of heating apparatus heat exchanger, the first pump, the second pump, the first three-way valve, the second three-way valve, and the cooling module are connected to the controller; the battery management module measures the battery pack temperature; and the heating apparatus control unit measures temperature of at least one of the switch module and energy storage unit in the heating apparatus; wherein the controller controls at least one of the first pump, the second pump, the first three-way valve, the second three-way valve, and the cooling module based on data from the medium outlet temperature sensor of heating apparatus heat exchanger, the battery management module, and the heating apparatus control unit, so as to implement at least one operating mode of the thermal management system.

12. The thermal management system according to claim 11, wherein under the condition that the heating apparatus is in operating state, when the temperature of the energy storage unit measured by the heating apparatus control unit is higher than an energy storage unit temperature threshold or when the temperature of the switch module is higher than a switch module temperature threshold, the controller turns on the first pump, turns off the second pump, controls the first three-way valve to make only the first valve port communicate with the common valve port, controls the second three-way valve to make only the first valve port communicate with the common valve port, and turns on the cooling module so as to cool the heating apparatus.

13. The thermal management system according to claim 11, wherein under the condition that the heating apparatus is in operating state, when the temperature of the energy storage unit measured by the heating apparatus control unit is not higher than an energy storage unit temperature threshold and the temperature of the switch module is not higher than a switch module temperature threshold, the controller further controls at least one of the first pump, the second pump, the first three-way valve, the second three-way valve, and the cooling module based on data from the medium outlet temperature sensor of heating apparatus heat exchanger and the battery management module.

14. The thermal management system according to claim 13, wherein when temperature of the heat exchange medium flowing out of the heating apparatus heat exchanger, measured by the medium outlet temperature sensor of heating apparatus heat exchanger, is higher than the battery pack temperature measured by the battery management module, the controller turns on the first pump, turns on the second pump, controls the first three-way valve to make only the first valve port communicate with the common valve port, controls the second three-way valve to make only the second valve port communicate with the common valve port, and turns off the cooling module so as to transfer heat from the heating apparatus to the battery pack.

15. The thermal management system according to claim 13, wherein when temperature of the heat exchange medium flowing out of the heating apparatus heat exchanger, measured by the medium outlet temperature sensor of heating apparatus heat exchanger, is not higher than the battery pack temperature measured by the battery management module, the controller turns on the first pump, turns off the second pump, controls the first three-way valve to make only the second valve port communicate with the common valve port, controls the second three-way valve to make only the first valve port communicate with the common valve port, and turns off the cooling module so as to transfer heat from the heating apparatus to the heat exchange medium in the pipeline subsystem.

16. The thermal management system according to claim 11, wherein under the condition that the heating apparatus is not in operating state, when the battery pack temperature measured by the battery management module is higher than a first battery pack temperature threshold, the controller turns off the first pump, turns on the second pump, controls the first three-way valve to make only the second valve port communicate with the common valve port, controls the second three-way valve to make only the second valve port communicate with the common valve port, and turns off the cooling module so as to cool the battery pack.

17. The thermal management system according to claim 16, wherein when the battery pack temperature measured by the battery management module is higher than a second battery pack temperature threshold, the controller turns off the first pump, turns on the second pump, controls the first three-way valve to make only the second valve port communicate with the common valve port, controls the second three-way valve to make only the second valve port communicate with the common valve port, and turns on the cooling module so as to cool the battery pack.

* * * * *